Sept. 12, 1972     D. V. LOUZOS     3,690,866
LEAD FIBERS USEFUL FOR GALVANIC CELL ELECTRODES
Filed April 6, 1970     2 Sheets-Sheet 1
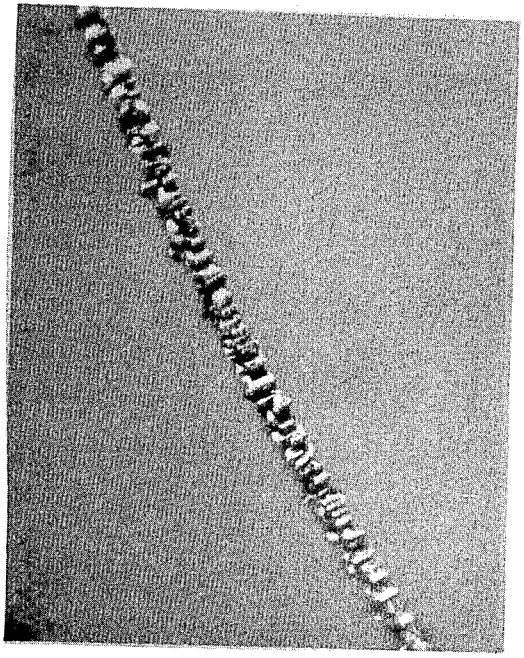
FIG. 1.
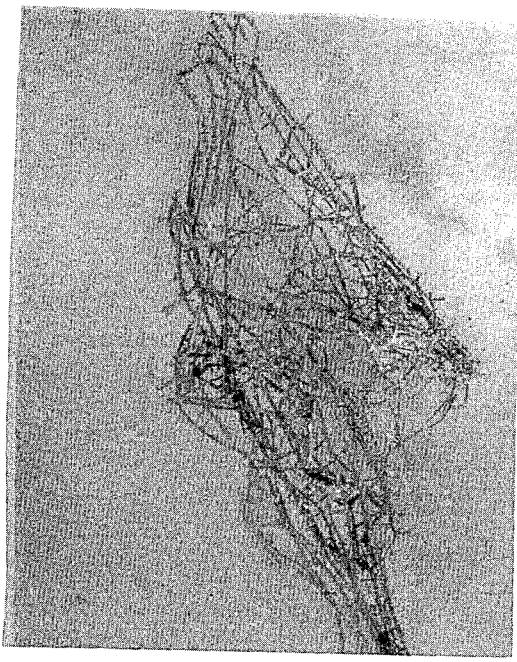
FIG. 2.
INVENTOR.
Demetrios V. Louzos
BY
ATTORNEY

United States Patent Office 3,690,866
Patented Sept. 12, 1972

3,690,866
LEAD FIBERS USEFUL FOR GALVANIC CELL ELECTRODES
Demetrios V. Louzos, Rocky River, Ohio, assignor to Union Carbide Corporation, New York, N.Y.
Filed Apr. 6, 1970, Ser. No. 25,860
Int. Cl. C22b 23/00
U.S. Cl. 75—.5                                    1 Claim

ABSTRACT OF THE DISCLOSURE

Stable, high surface area lead fibers composed of a single elongated chain of cubic growths interconnected and grown along one direction. The lead fibers are prepared by the electrolysis of a soluble lead salt-containing electrolyte solution under conditions of extremely high cathode current density. Galvanic cell electrodes are fabricated using the lead fibers by compression molding techniques.

---

This invention relates to novel lead fibers and to a process for their preparation. In one aspect, the invention relates to galvanic cell electrodes fabricated from the novel lead fibers and to the use of these electrodes particularly in secondary or rechargeable cells of the lead-acid type.

BACKGROUND OF THE INVENTION

Prior art pasted type electrodes for lead-acid cells have generally been made by applying to a lead grid a wet paste of the desired lead oxide or mixture of lead oxides with dilute sulfuric acid, compressing the pasted grid, curing or soaking the compressed pasted grid and then electrically converting the oxides in a sulfuric acid solution to the desired spongy lead in the case where the electrodes are to be used as anodes or lead peroxide in the case where the electrodes are to be used as cathodes.

Although prior art pasted type electrodes have been used for many years now, the preparation and electroforming procedures for making the electrodes are very time consuming and consequently the manufacturing cost of the electrodes is high. Another difficulty resides in the fact that these pasted type electrodes may often require the use of a binder material in order to hold the pasted electrode together and to prevent spalling of the active material. Still another disadvantage is the fact that the spongy lead formed on the electrodes which are to be used as anodes is very rapidly oxidized upon exposure to atmosphere and these electrodes must be kept submerged in an acid bath or given other special treatment in order to prevent oxidation.

SUMMARY OF THE INVENTION

The invention contemplates the provision of novel lead fibers possessing certain properties which make them ideal for use in fabricating galvanic cell electrodes. The lead fibers of the invention are quite readily distinguishable in physical appearance from other forms of lead heretofore known in the art. The lead fibers of the invention may be basically described as fibers composed of an elongated spine or chain of cubic growths interconnected and grown along one direction. The lead fibers may also include some side growths, each of which is of the same basic structure as the main fiber, i.e., each consisting of an elongated spine or chain of interconnected cubic growths. The side growths generally grow along one direction at an angle of approximately 90 degrees from the axis of the main fiber.

The novel lead fibers of the invention are primarily characterized by their relatively high surface area, purity and stability. The lead fibers are stable in that they do not rapidly oxidize upon exposure to the atmosphere. The specific surface area of the lead fibers is about 0.17 square meter per gram. The length of the lead fibers measured along the elongated spine or chain of interconnected cubic growths may vary from relatively short fibers of about 1/16 inch to long fibers of about 1½ inches in length. The diameter or width of the fibers measured across the elongated spine or chain of interconnected cubic growths is between about 0.001 and 0.006 inch. The average diameter or width of the fibers is between about 0.002 and 0.003 inch.

In the practice of the invention, the novel lead fibers are prepared by the electrolysis of a soluble lead salt-containing electrolyte under conditions of extremely high cathode current density. Generally speaking, the minimum current density for electroforming the lead fibers will depend upon the particular electrolyte solution employed. The preferred electrolyte solution is an aqueous solution of lead acetate or lead nitrate. In the case where a lead nitrate solution is used, the cathode current density should be at least about 1000 amperes per square foot and preferably should be above about 2000 amperes per square foot. In the case where a lead acetate solution is used, the minimum current density for electroforming the fibers is about 20,000 amperes per square foot.

The process for preparing the novel lead fibers of the invention may be carried out at about room temperature in a typical electrolysis cell using a pure lead sheet anode and a thin cathode suspended in the electrolyte bath. The fibers electroform at the cathode and are relatively short or long depending upon the cathode current density used. Short fibers may be formed if the cathode current density is maintained at about the minimum current density for electroforming the fibers. The short fibers may be easily broken off from the cathode surfaces and collected at the bottom of the bath. At high current densities longer fibers are formed at the cathode which, if not removed and the electrolysis allowed to proceed, tend to electrodeposit in the form of an interconnected skeletal lead fibrous mat. This interconnected skeletal lead fibrous mat consists basically of multiple fibers joined to one or more neighboring fibers throughout the mat. By the term "electroform" or "electroformation" as used herein is meant the production of lead fibers by electrodeposition.

Galvanic cell electrodes can be readily fabricated from the novel lead fibers using conventional compression molding techniques. The novel lead fibers prepared as described above are placed within the mold and then compression molded to form an electrode compact of the desired size and configuration. When compression is applied, the fibers readily interlock or interknit producing a highly cohesive electrode body which is capable of supporting its own weight and retaining the shape in which it is molded.

The galvanic cell electrodes so prepared can be advantageously used as rechargeable electrodes, both anodes and cathodes, in secondary or rechargeable lead-acid cells. If the electrodes are to be used as cathodes, the surfaces of the electrodes can be electrolytically converted to lead peroxide in a sulfuric acid solution.

The principal advantages of the rechargeable lead electrodes fabricated in accordance with the invention are that they are self-supporting and can be fabricated without the need for a binder material and further that the electrodes are not susceptible to rapid oxidation upon exposure to the atmosphere and consequently require no special handling during manufacture.

BRIEF DESCRIPTION OF THE DRAWING

The invention will be more particularly understood by reference to the following detailed description of the preferred embodiments thereof, taken in conjunction with the accompanying drawing, wherein:

FIG. 1 is a photomicrograph showing a typical lead fiber under 90 fold magnification;

FIG. 2 is a photomicrograph showing an interconnected skeletal lead fibrous mat under 10 fold magnification.

DESCRIPTION OF THE PREFERRED EMBODIMENTS

Figure 3:
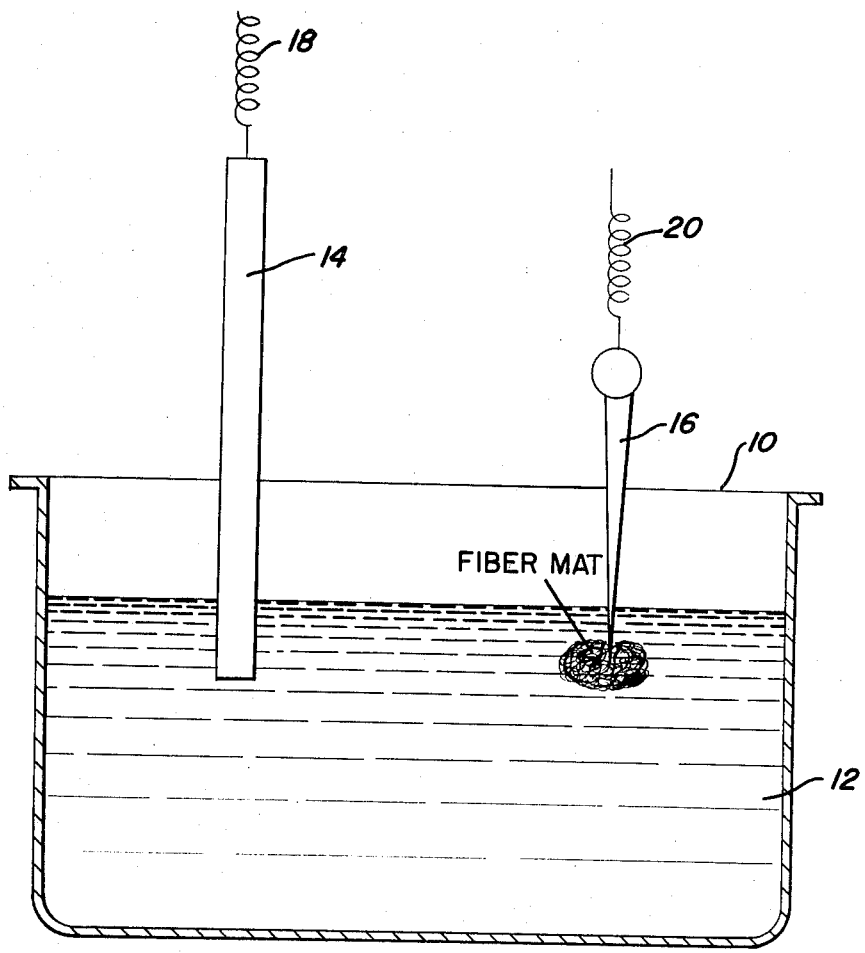
FIG. 3 is a schematic view of a typical electrolysis cell used for preparing the lead fibers in accordance with the invention.

Referring to FIG. 1, there is shown a photomicrograph of a typical lead fiber under 90 fold magnification. It will be readily seen that the individual lead fiber shown in the photomicrograph consists essentially of a single elongated spine or chain of cubic growths interconnected and grown along one direction. The lead fiber shown in the photomicrograph is fairly smooth in appearance and there are no side growths or branches. FIG. 2 shows a photomicrograph under 10 fold magnification of an interconnected skeletal lead fibrous mat. It will be seen from this photomicrograph that the mat is basically a skeletal structure of interconnected fibers joined to one or more neighboring fibers.

FIG. 3 shows schematically a typical electrolysis cell for preparing the lead fibers in accordance with the invention. The cell consists of an open tank 10 which is approximately three-quarters filled with a soluble lead salt-containing electrolyte bath 12. Suspended in the electrolyte bath 12 is a high purity lead sheet anode 14. The cathode 16, which is preferably of a pointed or "icicle" shape, is dipped just below the surface of the electrolyte bath 12.

In a practical cell, an array of multiple cathodes suspended within the electrolyte bath from a common bus bar may be used, there being only one cathode shown here for the purposes of illustration. The anode 14 and cathode 16 are connected respectively through means of wires 18, 20 into an external circuit (not shown). The circuit includes a source of direct electrical current and means such as a rheostat for controlling the flow of electrical current through the cell.

To carry out the electroformation process of the invention, the external circuit is closed suitably by means of a switch and electrical current is allowed to flow through the cell. The anode is consumed during the electrolysis forming lead ions in the electrolyte and depositing lead at the cathode in accordance with the following reactions:

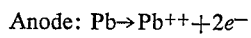

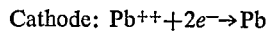

Essentially all of the electrical current flowing through the cell is utilized in forming the lead deposit. The cell electrolyte is essentially invariant in that the anode is continuously replenishing lead ions into the electrolyte as lead ions are removed at the cathode.

It was recognized early in the experimental work that one of the essential requirements for carrying out the electro-formation process is the maintenance of extremely high cathode current densities. It has been found in accordance with the invention that in the case where the electrolyte is an aqueous solution of lead nitrate, the cathode current density should be maintained at about at least 1000 amperes per square foot and preferably about 2000 amperes per square foot. In the case where the electrolyte is an aqueous solution of lead acetate, it has been found that the cathode current density should be maintained at about at least 20,000 amperes per square foot. These cathode current densities are significantly higher than that used in the electroplating art for depositing conventional coatings of lead from a fluoborate and a sulfamate bath wherein cathode current densities of from about 5 to 70 and from 10 to 60 amperes per square foot respectively have been reported (A. K. Graham, Electroplating Engineering Handbook, p. 209, Reinhold Publ. Co., 1955). Since the current density is inversely proportional to the cathode surface area for a given current, it is advantageous to employ a cathode of the smallest practical surface area exposed to the electrolye and preferably a pointed or "icicle" shaped cathode is used.

During the electroformation process, if the cathode current density is initially maintained at about the minimum current density required for electroforming the lead fibers, the fibers first deposit at the cathode in the form of relatively small individual fibers, e.g., about 0.1 to 0.2 inch. The short fibers which initially deposit at the cathode may be easily broken off from the cathode surfaces and then collected at the bottom of the electrolyte bath. When the cathode current density is increased substantially above the minimum current density, the fibers which deposit at the cathode will be longer fibers of about 1 to 1½ inches in length. If the electroformation process is then continued at the higher current densities, more and more fibers will be deposited on the initial growth on the cathode surfaces. This is believed due to the establishment on the surfaces of the previously formed fibers of points of higher current density. More fibers will continue to grow in this manner so long as sufficient electrical current is flowing through the cell, and eventually an interconnected skeletal lead fibrous mat will be formed. This skeletal fibrous mat consists basically of multiple fibers joined to one or more neighboring fibers in the mat.

Once the electroformation of the interconnected skeletal lead fibrous mat has begun, it may be necessary to periodically increase the flow of electrical current through the cell by means of the rheostat in order to meet the increased current requirements due to the increasingly greater number of fibers being deposited. It is virtually impossible during this period of the process to determine the cathode current density with any degree of accuracy due to the rapidly changing surface area of the lead deposits. However, the electroformation process may be expediently carried out by properly controlling the amount of the electrical current flowing through the cell to provide an estimated cathode current density which is above the minimum requirement for the electroformation of the fibers. The proper range of cathode current density can be estimated simply by visual observation of the type of deposit or reaction occurring at the cathode. If the cathode current density is too low, no fiber deposit can be observed. The deposit in this instance will be of the level, adherent or powdery type. If the cathode current density is too high, gas evolution (hydrogen) will be readily observed.

In the practice of the invention, the electrolyte may contain a lead salt whose principal requirement is that it be soluble in a solvent of high dielectric constant resulting in a solution of sufficient ionic conductivity to permit the maintenance of at least the minimum cathode current density necessary for electroforming the lead fibers of the invention.

The preferred soluble lead salts for use in the electrolyte are lead acetate and lead nitrate. Other suitable soluble lead salts include the chlorate, perchlorate, citrate, fluosilicate, fluoborate and sulfamate. Suitable solvents for the lead salt include water and organic solvents, notably methanol and ethanol. Water is the preferred solvent because of its low cost and freedom from fire hazard and toxicity.

The concentration of the soluble lead salt in the electrolyte solution should be fairly high in order to promote the electroformation process and to maintain a sufficiently high conductivity. A saturated aqueous solution of lead nitrate or lead acetate has been used successfully.

The preparation of lead fibers may be illustrated by the following examples:

EXAMPLE 1

A saturated solution of lead nitrate was prepared by dissolving 467 grams of $Pb(NO_3)_2$ in 700 grams of water (approximately 40% by weight lead nitrate). A laboratory scale electrolysis cell was prepared by pouring the solution into a 600 ml. breaker and then immersing in the solution a pure lead sheet anode. The cathode was a single "icicle" shaped tapered body of lead, the finely pointed tip of which was allowed to just touch the solution surface. The area of this point contact was calculated to be about 0.0001 square inch. Anode to cathode distance was about 1½ inches. The temperature of the solution was maintained at about 25° C. Electrolysis was begun by passing through the cell 15 milliamperes of current, i.e., equivalent current density of about $2.16 \times 10^4$ amperes per square foot, at a voltage of about 0.22 volt. Very straight short fibers of the order of about 0.1 inch in length were electrodeposited on the cathode. The current was then increased to about $1.58 \times 10^5$ amperes per square foot, at a voltage of about 0.60 volt and straight fibers of about ¼ to ½ inch in length were deposited. These fibers were fairly smooth and had very little side growths or branches. The current was then increased again to about 1 ampere, i.e., equivalent current density of about $14.4 \times 10^5$ amperes per square foot, at a voltage of about 2.0 volts. Straight fibers of about ½ to 1½ inches in length were deposited. These fibers contained essentially no side growths or branches. The current was then increased to 3 amperes, i.e., equivalent current density of about $4.32 \times 10^6$ amperes per square foot, at a voltage of about 8 volts and very short fibers of about 1/16 inch in length with essentially no side growths or branches were deposited. In a very short time, a skeletal fibrous mat of these fibers formed from the previously deposited fibers, the individual fibers in the mat being approximately 1 to 1½ inches in length. The current flowing through the cell at this time increased to about 6 amperes and the voltage was 6.7 volts.

EXAMPLE 2

A saturated solution of lead acetate was prepared by dissolving 451 grams of $Pb(C_2H_3O_2)_2 \cdot 3H_2O$ in 700 grams of water (approximately 40% by weight lead acetate). An electrolysis cell of the same type described in the previous example was then prepared using the saturated lead acetate solution as the electrolyte bath. Electrolysis was begun by passing through the cell 20 milliamperes of current, i.e., equivalent current density of about $2.88 \times 10^4$ amperes per square foot, at 4.0 volts. Clean short fibers of about 0.2 inch in length were deposited on the cathode. The current was then increased to about 100 milliamperes, i.e., equivalent current density of $14.4 \times 10^4$ amperes per square foot, at 10 volts and clean short fibers of about 0.1 inch in length with little side growth were deposited. The current was then increased to about 0.5 ampere, i.e., equivalent current density of about $7.2 \times 10^5$ amperes per square foot at 22 volts. Very short clean fibers of about 0.1 inch in length were deposited and from the initial growth of these fibers, a skeletal fibrous mat began to deposit. The individual fibers in the mat ranged in length up to about ½ inch. The mat eventually broke away from the cathode surface and fell to the bottom of the container.

Surface area measurements of the lead fibers prepared in accordance with the invention have been made using the krypton absorption BET[1] method. The fibers were found to possess a specific surface area of about 0.17 square meter per gram. Although the lead fibers were found to possess a relatively high surface area, they are not so highly developed as to be pyrophoric and subject to rapid oxidation when exposed to the atmosphere.

The lead fibers prepared in accordance with the invention are composed essentially of pure lead. The electroformation process is accompanied by electropurification and the fibers so prepared are probably one of the purest forms of lead obtainable within a reasonable economic framework.

It has been found in accordance with the invention that the lead fibers prepared in the manner as described above may be advantageously used to fabricate electrodes, both anodes and cathodes, for lead-acid cells. The fibers prepared by the electroformation process may be used to fabricate anode without any additional treatment. If the fibers are to be used to fabricate cathodes, the surfaces of the lead fibers may be electrolytically converted to lead peroxide in a sulfuric acid bath. The electrolytic conversion treatment may be carried out immediately after the fibers have been electrodeposited by transferring the fibers or the interconnected skeletal fibrous mats while still deposited on the cathode to the sulfuric acid bath. The electrode with the fibers attached is then made the anode and an electrical current is passed through the bath in order to electro-oxidize the surface of the fibers.

Electrodes may be fabricated from the lead fibers in accordance with the invention by conventional compression molding techniques. The fibers or interconnected skeletal fibrous mats are placed within a suitable mold of the size and configuration desired and then compressed under a suitable pressure, say about 5 p.s.i. When the individual fibers are used, the fibers should be thoroughly intermingled with one another so that they are arranged in randomly orientated fashion within the mold with each of the fibers making contact with as many neighboring fibers as possible. It will be seen that the interconnected skeletal fibrous mats are preferred for use in this molding procedure since the fibers in the mats become intermingled during electroforming and are joined to one or more neighboring fibers in the mat. Upon the application of pressure, the intermingled fibers readily interlock or interknit producing a compact of high strength and cohesiveness and low electrical resistance.

Cathodes for use in lead-acid cells may also be fabricated in accordance with the invention by compression molding the individual lead fibers or mats before the electrolytic conversion treatment. In this alternate procedure, the fibers or mats are placed within the mold and compressed to the desired shape or configuration. The shaped cathode is then removed from the mold and placed in the sulfuric acid bath for electrolytic conversion of the surfaces of the fibers to lead peroxide.

Pasted type electrodes for use in lead-acid cells may also be fabricated using the lead fibers as a binder material. In this instance, the electrodes are made by mixing the desired lead oxide or mixtures of oxides with the lead fibers and compressing this mixture onto a grid. The interlocking characteristics of the fibers assist in preventing spalling of the active material which may occur in the pasted type electrodes of the prior art.

From the foregoing, it will be seen that the invention provides novel lead fibers which can be advantageously used to fabricate galvanic cell electrodes and particularly anodes and cathodes for lead-acid cells. The electrodes so prepared in accordance with the invention possess high

---

[1] BET method—Journal of American Chemical Society, vol. 60, p. 309, 1938, S. Brunauer, P. H. Emmett and E. Teller.

strength and cohesiveness and can support their own weight and consequently do not require the use of a binder material. Additionally, the electrodes prepared from the lead fibers are stable and do not readily oxidize on exposure to the atmosphere and thus do not require any special treatment during handling to prevent oxidation.

What is claimed is:

1. Stable, high surface area lead fibers composed of a single elongated chain of cubic growths interconnected and grown along one direction, said fibers having a length of from about 1/16 inch to about 1½ inches, a width of between about 0.001 and 0.006 inch and a specific surface area of about 0.17 square meter per gram.

References Cited

UNITED STATES PATENTS

| 2,677,713 | 5/1954 | Weil et al. | 136—26 |
| 3,231,341 | 1/1966 | Sump et al. | 29—182 R |
| 3,466,193 | 9/1969 | Hughel | 136—26 |

WINSTON A. DOUGLAS, Primary Examiner

C. H. LEFEVOUR, Assistant Examiner

U.S. Cl. X.R.

136—26; 204—10